United States Patent [19]

Sadler et al.

[11] 4,171,238

[45] Oct. 16, 1979

[54] METHOD OF MAKING REINFORCED PLASTIC COMPOSITE STRUCTURE

[75] Inventors: Thomas H. Sadler, Morrison; John J. Dalton, Littleton, both of Colo.

[73] Assignee: Johns-Manville Corporation, Denver, Colo.

[21] Appl. No.: 753,973

[22] Filed: Dec. 23, 1976

[51] Int. Cl.² .................................................. B32B 5/16
[52] U.S. Cl. ...................................... 156/173; 106/76; 106/89; 106/94; 106/97; 138/141; 138/145; 156/189
[58] Field of Search ............... 156/173, 189, 191, 192; 138/137, 141, 145, 146, 174, 175, DIG. 7; 106/76, 89, 90, 92, 94, 97

[56] References Cited

U.S. PATENT DOCUMENTS

| | | | |
|---|---|---|---|
| 784,318 | 3/1905 | Gregg | 106/94 |
| 2,434,465 | 1/1948 | Marc | 106/76 |
| 3,489,626 | 1/1970 | Rubenstein | 156/173 |
| 3,520,749 | 7/1970 | Rubenstein | 156/173 |
| 3,706,615 | 12/1972 | Nishiyama | 156/169 |
| 3,888,712 | 6/1975 | Akiyoshi | 156/171 |
| 3,893,488 | 7/1975 | Rogers et al. | 138/141 |
| 3,948,294 | 4/1976 | Magarian | 138/141 |

*Primary Examiner*—Caleb Weston
*Attorney, Agent, or Firm*—Robert M. Krone; Joseph J. Kelly; Gregory W. O'Connor

[57] ABSTRACT

A reinforced plastic composite structure, particularly a pipe, is disclosed herein. The composite pipe, which resists acid attack even in underground applications where the pipe is subjected to external loading stresses, typically includes at least an inner zone, e.g. a resin impregnated fibrous sheet and an outer zone including a layer or layers of fibers. A cured polymeric resin matrix bonds the fibrous sheet and the fibrous layers together in a laminar relationship. The improvement disclosed herein comprises incorporating into this polymeric resin matrix a particulate substance which has specific particle size limitations and which is selected from the group consisting of portland cement, marble dust or a mixture thereof.

6 Claims, No Drawings

METHOD OF MAKING REINFORCED PLASTIC COMPOSITE STRUCTURE

BACKGROUND OF THE INVENTION

1. Field of the Invention

The present invention relates to a reinforced plastic composite structure. More particularly, the present invention relates to a corrosion resistant plastic composite structure, such as pipe, which is not prone to failure when exposed to corrosive liquids, e.g. acid.

2. Description of Prior Art

Reinforced plastic composite structures, for example pipes, are commonly formed by winding resin-impregnated filaments on a removable mandrel, curing the resin-impregnated structure and subsequently removing the mandrel from the cured pipe. By appropriate selection of the filaments and the resin (typically glass filaments and a polyester resin), the composite pipe can be fabricated so as to exhibit generally acceptable corrosion resistance in applications not exposed to stress conditions. Such corrosion resistance is due to the inherent resistance of polyester resin to acid and alkali attack. However, when the pipe is subjected to heavy external loading, for example, by the weight of backfill placed over it when the pipe section is buried in the ground, crazing of the interior surface of the resin, often a gel coat, can occur, thereby exposing the filaments to acidic conditions.

More specifically, when a pipe section is subjected to such external loading, deformation of the pipe section is resisted by shear stresses which tend to concentrate along the inner-circumferential wall surface of the pipe. These shear stresses, in turn, can result in the resin crazing or cracking along this inner-circumferential surface. If excessive strain causes the resin to crack or craze, the glass filaments may be exposed to corrosive attack. When corrosive fluid, such as acid, attacks the glass filaments, penetration of the entire pipe wall structure by the acid can occur very rapidly and can result in mechanical failure of the entire composite structure. This cracking problem and resultant mechanical failure is particularly likely when the composite structure is used as sewer pipe. Bacteria and other microorganisms attack organic materials in domestic sewage to form acids capable of attacking the glass reinforcement filaments. Since the glass filaments provide strength to the composite structure, if these are weakened by corrosive attack, the entire pipe can fail.

Various attempts have been made in the past to overcome the potential failure problem of reinforced plastic pipe due to corrosive attack of the wall structure. Most of these attempts have concentrated on various improvements of a craze resistant interior surface gel coat lining to protect the glass fibers from acid attack. One known craze resistant gel coat is disclosed in U.S. Pat.No. 3,893,488. The present invention does not require a special inner lining or gel coat, but rather provides a reinforced plastic structure which throughout its entire thickness is designed to resist crazing under normal external stress conditions. Even if some cracking or crazing of the resin matrix results due to external stress on the structure, the resin matrix of the present invention has been found to inhibit propagation of such cracks. Since any cracks which do result do not increase in size or number by further exposure to acidic fluids, the glass filaments are not exposed to acid attack and retain their reinforcement ability.

Heretofore, the resin matrix in reinforced plastic pipe composites generally has been filled with a relatively inexpensive inert filler such as aluminum silicate clay. For example, U.S. Pat. No. 3,706,615 discloses the incorporation of additives such as sand, calcium carbonate generally, or clay in the resin and U.S. Pat. No. 3,406,724 discloses the incorporation of 20–85% of a filler such as quartz, chalk, kaolin, or rock flour in plastic sewer pipe. As will be seen hereinafter, the present invention is not intended to cover the incorporation of calcium carbonate generally as a filler. Rather, the present invention is directed to incorporating into the resin component a particulate substance having a specific particle size and selected from the group consisting of portland cement, marble dust or a mixture thereof. These substances are not merely inert fillers, but rather, their incorporation in the resin produces a structure exhibiting much greater acid resistance than prior art composite structures.

BRIEF DESCRIPTION OF THE INVENTION

In view of the foregoing, it is an object of the present invention to provide an improved reinforced plastic composite structure, specifically a pipe, which reduces the crazing or cracking tendency throughout the wall of the pipe.

Another object of the present invention is to eliminate the need for an interior gel coat layer in a reinforced plastic composite structure.

A further object of the present invention is to provide a method of making this composite structure.

The reinforced plastic composite structure includes at least one layer of fibers encased in a cured acid-resistant polymeric resin matrix. In accordance with the present invention, the improvement comprises incorporating a particulate substance selected from the group consisting of portland cement, marble dust or a mixture thereof in the polymeric resin matrix prior to curing thereof. Individual particles having an equivalent spherical diameter within the range of 10 to 70 microns comprise at least about 80% of the particulate substance or mixture incorporated into the resin matrix. Preferably about 65% of the particulate substance has an equivalent spherical diameter within the range of 10 to 40 microns. Since the particulate substance typically has an irregular configuration its size is represented by the diameter of a sphere having the same mass and specific gravity as the particle being measured. The comparative determination of the particle size can be achieved by any suitable means, e.g. a particle size analyzer such as a Coulter Counter manufactured by Coulter Counter Electronics, Inc., Hialeah, Fla.

When the composite structure of the present invention is a tubular article, e.g. a pipe, the method of making this pipe typically includes wrapping a fibrous sheet (or a layer of continuous filaments) saturated with an uncured polymeric resin matrix around a removable mandrel. Additional layers, for example, of continuous glass filaments or fiber glass tapes are subsequently wrapped around the mandrel. All of the layers are encased in the acid resistant polymeric resin matrix of the present invention. The resin matrix is subsequently cured so as to bond the layers together in a laminar relationship and the mandrel is removed.

The present invention provides a reinforced plastic composite structure which exhibits outstanding resistance to both acids and bases under typical external loading stress conditions. Propagation of cracks through the wall structure is inhibited, thereby providing a product having improved structural integrity.

DETAILED DESCRIPTION OF THE INVENTION

One embodiment of the present invention provides a reinforced plastic composite structure including an inner fibrous sheet, e.g. a veil cloth. A variety of fibers are suitable for use in the inner sheet including glass, polyester, polypropylene and polyamide fibers. In a preferred embodiment of the present invention, the inner sheet is a spunbonded veil cloth of crimped polyester fibers marketed by E. I. du Pont de Nemour and Co., Inc., under the trademark REEMAY. Such a spunbonded sheet exhibits good resistance to longterm exposure to both acids and alkalies in the range of 0.1 to 10.0 pH at temperatures below 100° F. and it exhibits a high break elongation.

The inner sheet is positioned around a forming surface, e.g. a mandrel, after saturation with an uncured polymeric resin matrix produced in accordance with the present invention.

The polymeric resin matrix of the present invention is formed from typical polymeric binder systems used in the preparation of reinforced plastic structures. The particular resin binder system utilized should be selected so as to enhance chemical bonding between the fibrous layers and the resin as the resin cures. Various promoters and catalysts may be incorporated in the resin matrix to accelerate or promote curing of the resin. For example, in an actual working embodiment, a polyester veil cloth is saturated with an isophthalic polyester resin to which a peroxide base catalyst and a diethyl-aniline promoter have been added.

In some instances it may be desirable to add flexibilizers to the resin. The incorporation of flexibilizers at levels of up to 15% by weight of the resin solids improves the elongation properties of the resin, and thereby tends to minimize the stress-cracking tendency of the resin. The selection of a particular flexibilizer will generally be in accordance with the recommendation of the manufacturer for a given resin.

The improvement according to the present invention comprises adding particulate marble dust or portland cement or a mixture thereof to a polyester or other suitable resin when the latter is in an uncured state. The actual amount of the particulate substance in the resin will be approximately 40-60 weight percent of the total resin matrix. The actual weight percent of particulate substance may vary depending on a number of known variables including for example the resin used and temperature of the resin. Generally speaking, however, the amount of particulate added should be sufficient to prevent "bleeding" or run off of the resin when saturating the fibers. The upper limit of the amount of particulate substance incorporated in the resin is reached when the resin is thickened to the point where it is unable to penetrate between the fibers during formation of the composite.

At least about 80% of the marble dust particles, portland cement particles, or mixtures thereof incorporated and dispersed throughout the uncured resin matrix have an equivalent spherical diameter within the range of about 10 to 70 microns. Preferably, approximately 65% of the particulate substance or substances incorporated into the uncured resin have an equivalent spherical diameter within the range of 10 to 40 microns.

The viscosity of the resin matrix having the particulate substance incorporated therein is generally within the range of 100-2000 centipoise, preferably within the range of 200-300 centipoise.

When portland cement is incorporated into the resin, it may be in the form of an unhydrated portland cement, a ground reacted (hydrated) portland cement or a mixture thereof. Furthermore, any of the five common types of portland cement can be utilized. In one actual working embodiment, Type 1 portland cement is incorporated into an isophthalic polyester resin. The term marble dust as used herein means particulate calcaceous rock capable of taking a polish, that is, dust from a metamorphic rock resulting from the recrystallization of limestone. The marble particles may be pure or they may have some impurities such as carbonaceous matter or iron oxides provided that any impurities are not of a nature or in an amount sufficient to interfere with the bonding or curing properties of the resin. Examples of suitable marble types which can be used in the present invention include Etowah, Creole, and Rutland marble. In an actual working embodiment Georga Marble Dust #7 marble particles, a Trademark of Georga Marble Co., Atlanta, Ga., were incorporated into a polyester resin.

The resin matrix, including the marble dust and/or portland cement particles, can be used to bond the inner layer to additional layers which typically include a plurality of layers of, for example, continuous glass filaments and glass tape. Sand or other granular material can be dispersed between these layers to increase the wall thickness of the structure.

In an actual working embodiment, a reinforced plastic composite structure of the present invention is formed directly on a conventional rotating mandrel commonly used in fabricating reinforced plastic pipes. A fibrous inner sheet is saturated with the uncured improved resin matrix according to the present invention using a conventional technique. The saturated sheet is then wrapped around the mandrel. Subsequently, the remainder of the wall structure is formed on the mandrel by a plurality of layers of the improved resin, glass filaments, glass woven roving tape and granular material such as sand. A resin-bonded outer layer of coarse granular material, e.g. sand, typically forms the exterior wall surface of the composite structure. The improved resin matrix is subsequently cured and the mandrel is removed from the composite structure.

The following examples are merely illustrative of the present invention and should not be understood as limiting the scope or principles of the invention.

EXAMPLES

A series of tests were made to determine the effect on sewer pipes as a result of exposure to sulfuric acid while under strain. The interior wall surface of arch samples made from 15 inch diameter pipe, (12 in. circumference, 0.3 in. wall thickness and approximately 3 in. wide), were exposed to 5% sulfuric acid while subjected to 1½% load producing strain. The cut edges were blocked with a room temperature vulcanized rubber in order to form a vessel within the arch to hold the sulfuric acid.

Strength properties of the various test specimens were measured using an Instron testing machine, model number 1102, Instron Corporation, Canton, Mass., set at 0.2 inches per minute ram travel speed and at 2 inches per minute chart speed over a 4 inch span. The testing procedure outlined in the Instron test manual 10-1015-3 for testing load and deflection properties was followed. All of the test sample formulas were identical except for the particulate material incorporated into the resin. Six hundred grams of an isophthalic polyester self-curing resin were mixed with 7 grams of a benzoyl peroxide paste and 18 drops of a diethylaniline promoter. Glass hoops of Owens-Corning roving, standard "E" glass, K861-AA-675 and glass tapes manufactured by Ferro Corporation, "E" glass, style #502 were wrapped about a saturated fibrous layer of REEMAY brand veil cloth #201. The particulate substances tested were:

1. ASP 400 P (Pulverized aluminum silicate clay)-Engelhard Minerals and Chemical Corp.
2. Type 1 Portland Cement (at least 80% having an equivalent spherical diameter within the range of 10 to 70 microns)
3. Marble dust #7-Georga Marble Company (at least 80% having an equivalent spherical diameter within the range of 10 to 70 microns)
4. Whitcarb W-Whitcarb Chemical Company (precipitated chalk)
5. Gamasperse 6532-Georga Marble Company (highly pulverized calcium carbonate)
6. Plaster of Paris ($CaSO_4.1/2\ H_2O$) commercial grade.

Equivalent spherical diameters for samples of the particulate substances of the types 1-5 listed above are indicated in Table I.

The test pipe samples were made by winding the resin saturated spunbonded polyester cloth on a conventional mandrel. A pipe build-up operation was performed wherein layers of resin and glass fiber and sand were applied to the rotating mandrel. More specifically, the pipe samples comprised an inner layer of REEMAY cloth, wrapped with successive resin impregnated layers comprising: (1) a layer of glass fiber hoops, (2) a layer of glass fiber tape, (3) a layer of glass fiber hoops, (4) a layer of sand, (5) a layer of glass fiber hoops, (6) a layer of sand, (7) a layer of glass fiber hoops, (8) a layer of sand, (9) two layers of glass fiber hoops, (10) a layer of glass fiber tape, and (11) two layers of glass fiber hoops. A final outer layer of coarse sand was used on all arch samples. Flat plate samples (5½ in. in length by 3 in. thick, by 0.5 in. wide) were used for water boil testing. The flat plate samples were identical in construction except for the outer layer. Instead of sand in the flat plate samples, an outer layer of REEMAY veil cloth was used to achieve a smooth flat uniformity on the outer surface of the sample. All samples were allowed to partially cure at room temperature (2-3 hours) before final oven curing of 30 minutes at 175° F.

The amount of particulate material incorporated in the polyester resin was based on resin viscosity (estimated to be between 200–500 centipoise). The portland cement and marble dust #7 which have surface areas of 3500–3800 $cm^2$/gm were used at the 300 gram level. The remaining particulate materials tested had surface areas of 5000–6000 $cm^2$/gm and were used at the 252 gram level.

Boiling tests were run in tap water over the time period indicated in Table II and the values reported are 5 specimen averages.

The results of these strain tests under corrosive conditions show that plastic pipe having particulate substances selected from the group consisting of portland cement or marble dust incorporated into the resin matrix provide outstanding service life.

As indicated in Table II, the samples with the Georga marble dust #7 had the highest initial flex modulus of rupture (MR) and they maintained about 70% of their initial strength after 3 days in boiling water. It should be noted that the Georgia Marble Dust #7 initial flex MR value is more than 60% greater than the sample using a conventional filler, i.e. ASP 400 P.

None of the samples containing Georga marble dust #7 or portland cement, i.e. samples 2, 3, 7 and 8, failed under the acid strain test during the 30 day test period. Samples 1, 4, 5, 6 and 9 did fail and upon failure the samples cracked and the acid penetrated through the entire wall structure.

TABLE I

| Equivalent Spherical Diameter of Particles Measured in Microns | Type I Portland Cement % Fraction by Coutler Counter* | Marble Dust #7 % Fraction by Coulter Counter | Gamasperse 6532 % Fraction by Sedigraph** | Whitcarb W (ppt Chalk) % fraction by Coulter Counter | ASP 400 p % Fraction by Coulter Counter |
|---|---|---|---|---|---|
| less than 1.5 | | | 6 | less than 1 | less than 1 |
| 1.0 | | | 9 | 4 | less than 1 |
| 2.0 | | less than 1 | 16 | 30 | 1 |
| 3.0 | less than 1 | 1 | 16 | 30 | 8 |
| 4.0 | less than 1 | 2 | 12 | 16 | 13 |
| 5.0 | less than 1 | 2 | 10 | 9 | 12 |
| 6.0 | less than 1 | 2 | 8 | 6 | 6 |
| 7.0 | less than 1 | 2 | 4 | 1 | 8 |
| 8.0 | less than 1 | 2 | 7 | 1 | 7 |
| 9.0 | less than 1 | 2 | 7 | 1 | 5 |
| 10.0 | 15 | 3 | 4 | *** 1 | 7 |
| 15.0 | 15 | 13 | less than 1 | | 16 |
| 20.0 | 13 | 15 | | | 10 |
| 25.0 | 10 | 5 | | | 4 |
| 30.0 | 7 | 16 | | less than | 1 |
| 35.0 | 8 | 11 | | | |
| 40.0 | 4 | 5 | | | |
| 45.0 | 3 | 6 | | | |
| 50.0 | 5 | 3 | | | |
| 60.0 | 2 | 5 | | | |
| 70.0 | less than 1 | 2 | | | |
| 80.0 | less than 1 | less than 1 | | | |
| 90.0 | less than 1 | less than 1 | | | |

TABLE I-continued

| Equivalent Spherical Diameter of Particles Measured in Microns | Type I Portland Cement % Fraction by Coutler Counter* | Marble Dust #7 % Fraction by Coulter Counter | Gamasperse 6532 % Fraction by Sedigraph** | Whitcarb W (ppt Chalk) % fraction by Coulter Counter | ASP 400 p % Fraction by Coulter Counter |
|---|---|---|---|---|---|
| 100.0 | less than 1 | less than 1 | | | |

*Coulter Counter - particle size analyzer manufactured by Coulter Counter Electronics, Inc., Hialeah, Florida **Sedigraph - particle size analyzer manufactured by Micromeritic Instrument Corp., Norcross, Georgia
***On random sampls up to 5% +625 mesh (20 microns) agglomerates were noted

TABLE II

| | 15" ARCH SAMPLES | FLAT PLATE SAMPLES Flex MR (psi) | | |
|---|---|---|---|---|
| SAMPLE DESCRIPTION | Acid Failure | Original | 3 DAY Boil | 7 Day Boil |
| 1. ASP 400 P | less than 2 days | 4360 | 2850 | 3050 |
| 2. Portland Cement (Type 1) | *greater than 30 days | 4375 | 2670 | 2710 |
| 3. Marble Dust #7 | greater than 30 days | 6790 | 4790 | 4070 |
| 4. Whitcarb W (ppt Chalk) | 13 days | | | |
| 5. Gamaspers (finely pulverized CaCO3) | 9 days | | | |
| 6. Plaster of Paris (CaSO4) | less than 3 days | | | |
| 7. Portland Cement + 100 ppm L-77** | greater than 30 days | 4800 | 2400 | 2230 |
| 8. Marble Dust #7 + 100 ppm L-77 | greater than 30 days | 5960 | 4450 | 3120 |
| 9. 90% Gamasperse +10% Type 1 Portland Cement | 14 days | | | |

*30 days - arbitrary cut-off time period
**L-77 - an organo-silicone surface active agent for polyester systems (Union Carbide)

What is claimed is:

1. In a method of making a reinforced plastic composite structure by (a) wrapping at least one layer of fibers saturated with an uncured polymeric resin matrix around a mandrel, (b) curing said polymeric matrix, and (c) subsequently removing said mandrel, the improvement comprising:

dispersing a particulate substance selected from the group consisting of portland cement, marble dust or mixtures thereof throughout said polymeric resin matrix while in a flowable uncured state, at least about 80% of said particulate susbstance having an equivalent spherical diameter in the range of about 10 to 70 microns.

2. A method according to claim 1 wherein at least about 65% of said particulate substance has an equivalent spherical diameter in the range of about 10 to 40 microns.

3. A method according to claim 1 wherein said particulate substance comprises 40 to 60 weight percent of the uncured polymeric resin matrix.

4. In a method of making a reinforced plastic composite pipe (a) wrapping a polyester veil cloth saturated with an uncured polyester resin around a mandrel to form an inner layer; (b) concentrically wrapping at least one layer of glass fibers around said inner layer, said layers being encased in the polyester resin; (c) incorporating a granular material between said layers as the layers are formed around said mandrel; (d) curing said polyester resin so as to bond said layers together in a laminar relationship; and (e) subsequently removing the mandrel, the improvement comprising:

incorporating a particulate substance selected from the group consisting of portland cement, marble dust or mixtures thereof into said polyester resin prior to curing thereof, at least about 80% of said particulate substance having an equivalent spherical diameter in the range of about 10 to 70 microns.

5. A method of making a reinforced plastic composite pipe according to claim 4 wherein at least about 65% of said particulate substance has an equivalent spherical diameter in the range of about 10 to 40 microns.

6. A method of making a reinforced plastic composite pipe according to claim 4 wherein said particulate substance comprises 40 to 60 weight percent of the uncured polyester resin.

* * * * *